Sept. 20, 1932.  R. D. SWANSON  1,878,346
TRAILER CART
Filed May 26, 1930  5 Sheets-Sheet 1

Inventor
REUBEN D. SWANSON.
By Horace Barnes,
Attorney

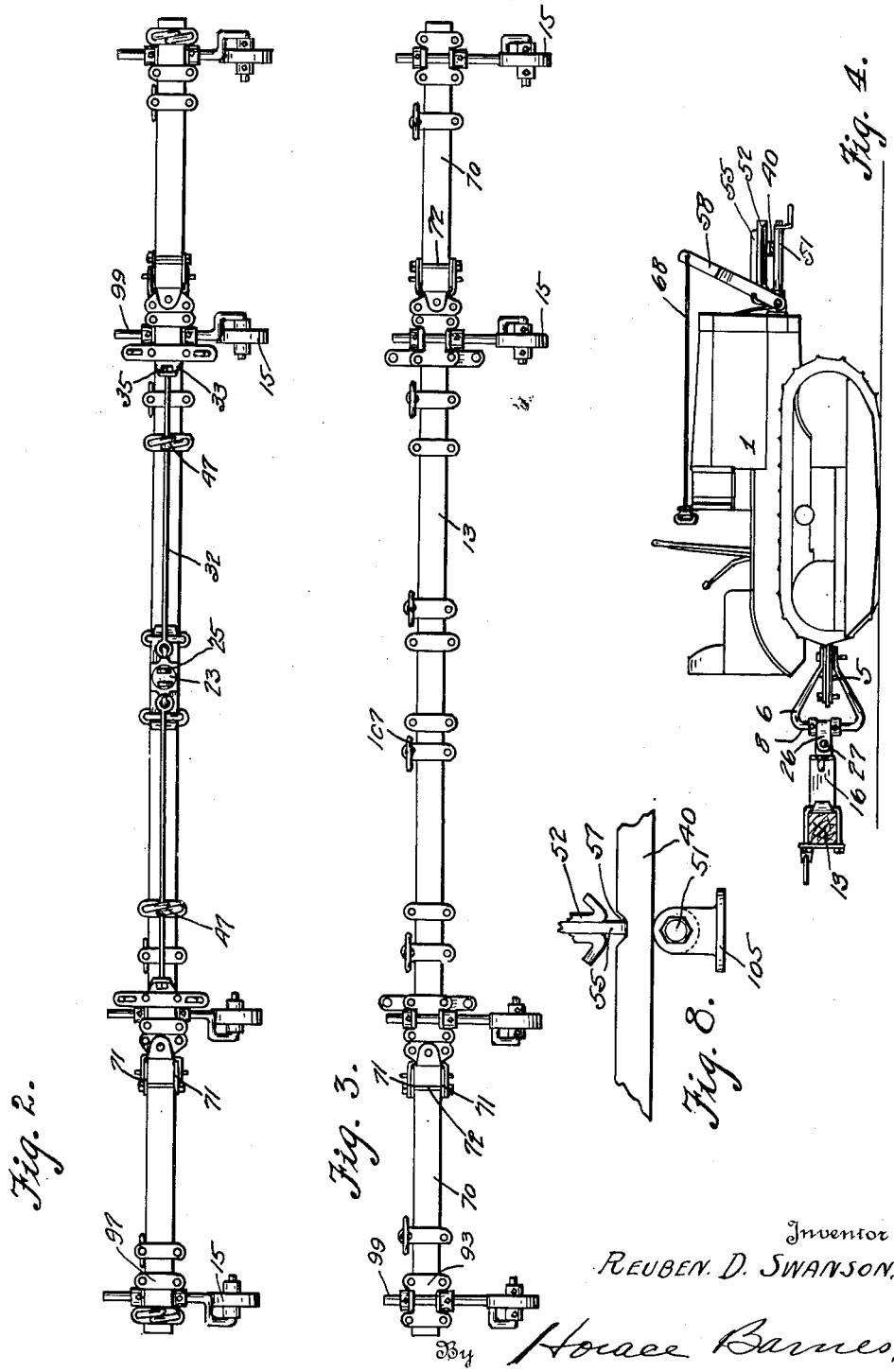

Sept. 20, 1932.    R. D. SWANSON    1,878,346
TRAILER CART
Filed May 26, 1930    5 Sheets-Sheet 3
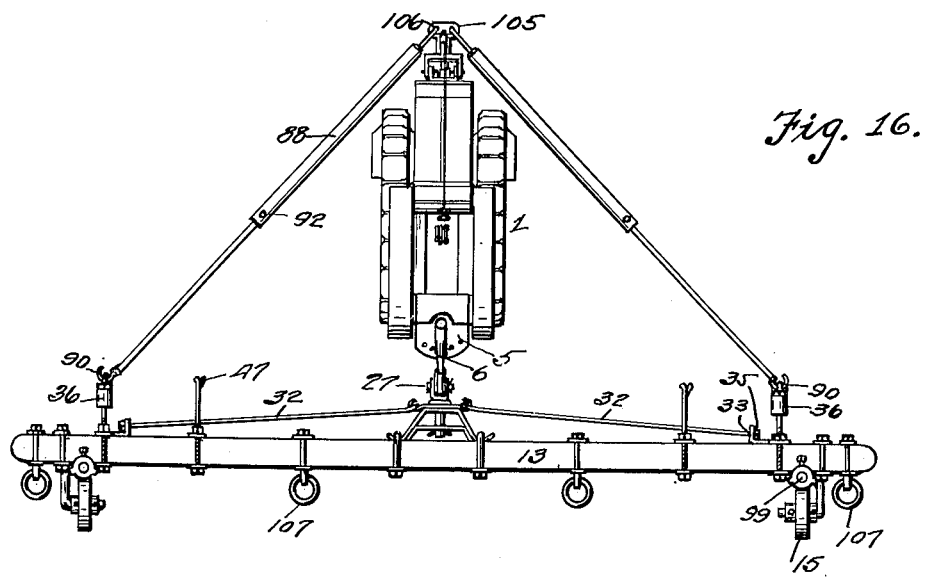
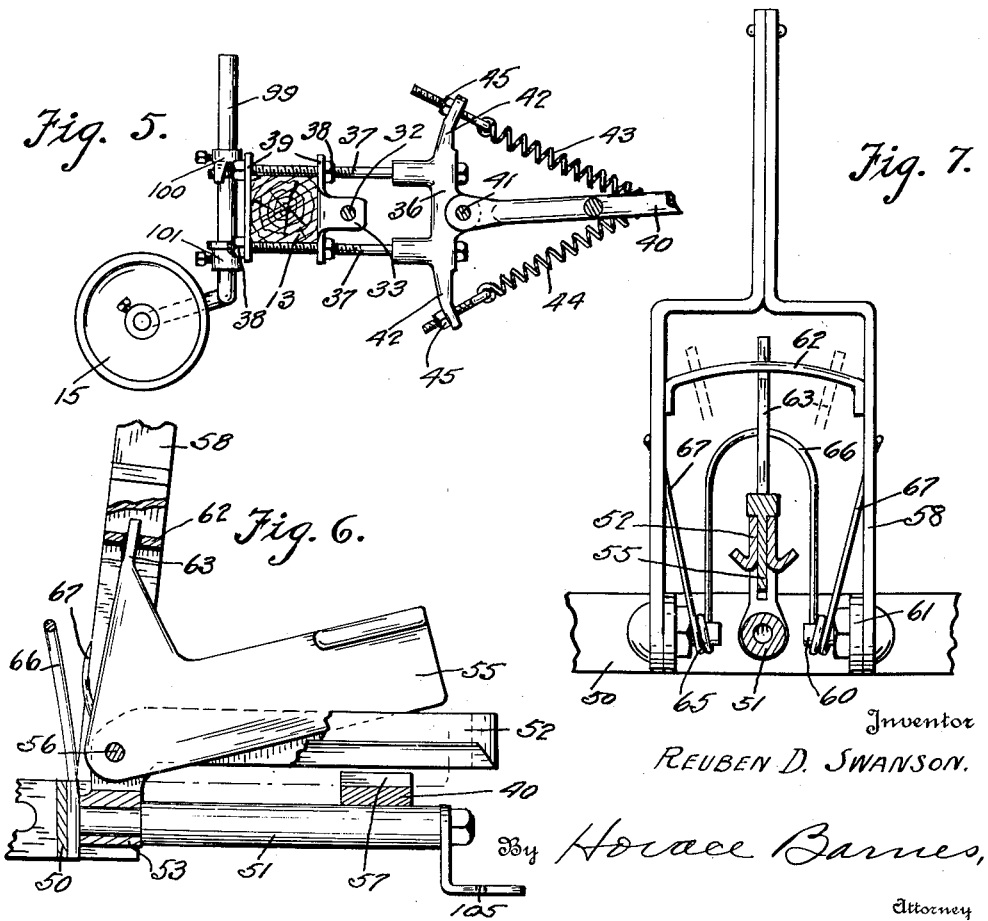
Inventor
REUBEN D. SWANSON.
By Horace Barnes,
Attorney Sept. 20, 1932.   R. D. SWANSON   1,878,346
TRAILER CART
Filed May 26, 1930   5 Sheets-Sheet 4
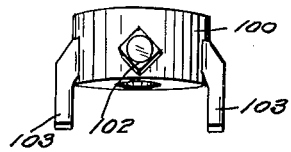
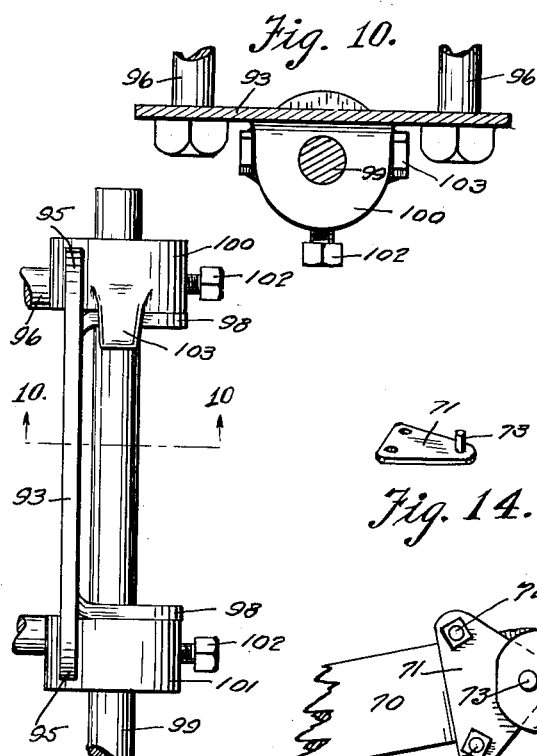
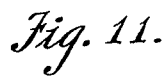
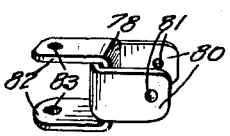
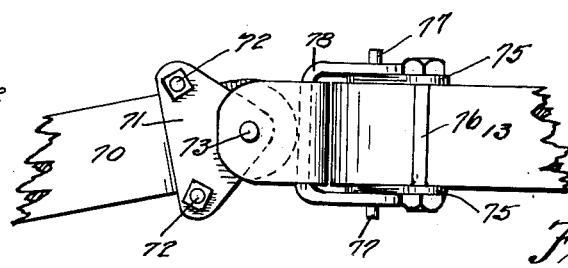
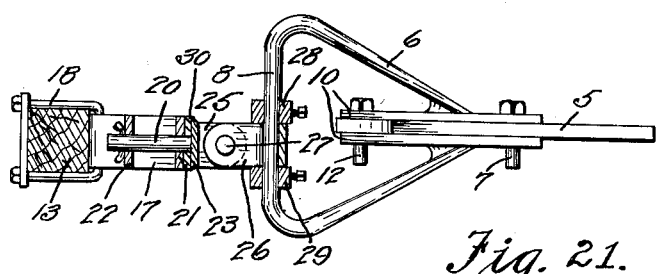
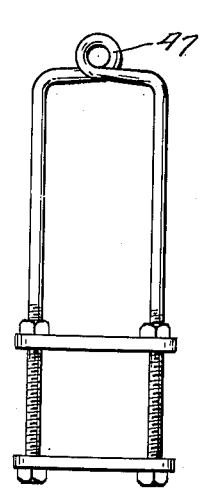
Inventor
REUBEN D. SWANSON,
By Horace Barnes,
Attorney Inventor
REUBEN D. SWANSON.

By Horace Barnes,
Attorney

Patented Sept. 20, 1932

1,878,346

UNITED STATES PATENT OFFICE

REUBEN D. SWANSON, OF WALLA WALLA, WASHINGTON, ASSIGNOR OF ONE-HALF TO OSCAR J. JAUSLIN, OF WALLA WALLA, WASHINGTON

TRAILER CART

Application filed May 26, 1930. Serial No. 455,747.

This invention relates to improvements in connective trailer apparatus for power tractors utilized to operate multiple drills, plows, and other tillage tools.

The object of the invention is to provide a trailer-cart of simple and practicable construction to which the tillage tools may be hitched in operative relation and which is connected to the tractor in close-coupled condition whereby the trailer and tools are at all times in full and complete control of the tractor operator.

A further object of the invention is the provision of draw-bar apparatus between the tractor and the trailer-cart of simple and novel construction admitting of automatic universal adjustment of the trailer to accommodate itself and the tools hitched thereto to the contours of the ground being cultivated while maintaining full guidance thereof in the tractor operator.

A still further object of the invention is to provide reliable connective apparatus between the ends of the trailer-cart and the fore part of the tractor whereby the directional control of the trailer-cart is compelled at all times by the movements of the tractor.

Numerous other objects and advantages residing in my invention and objects relating to details of construction and specific elements of the invention will be readily apparent in the course of the detailed description to follow.

The accompanying drawings, illustrate by way of example a representative form of the trailer-cart and contributing elements embodying my invention, in which:

Fig. 2 is a detached view in front elevation of the trailer-cart.

Fig. 3 is a similar view in rear elevation of the same.

Fig. 4 is a view in side elevation of a tractor showing the draw-bar apparatus connecting the trailer-cart thereto, the beam thereof being shown in cross-section.

Fig. 5 is a view in cross-section upon an enlarged scale of the trailer-beam showing the connections with the control-frame and the supporting-wheels in side elevation.

Fig. 6 is a fragmentary view in side elevation of the latch devices for the control-frame.

Fig. 7 is a complete view in cross-section on line 7—7 of Fig. 6.

Fig. 8 is a fragmentary view in front elevation of the control-frame and latch devices therefor.

Fig. 9 is a fragmentary view of a wheel-spindle in side elevation showing the same in locked condition.

Fig. 10 is a view in cross-section on line 10—10 of Fig. 9.

Fig. 11 is a detached perspective view of the set-collar element of the wheel devices.

Fig. 12 is a fragmentary top plan view of the trailer-beam and one of its extension-beams showing the pivotal joint therebetween.

Figs. 13 and 14 are detached perspective views of the said complementary pivotal joint members between the beam-parts.

Fig. 15 is a view in side elevation of one of the eye-bracket elements of the invention, shown detached.

Fig. 16 is a plan view of a tractor and trailer-cart illustrating a modified form of control-frame.

Fig. 21 is a detached view in side elevation of the draw-bar devices of the tractor and showing in medial section the devices connecting the trailer-cart therewith.

Figure 1:
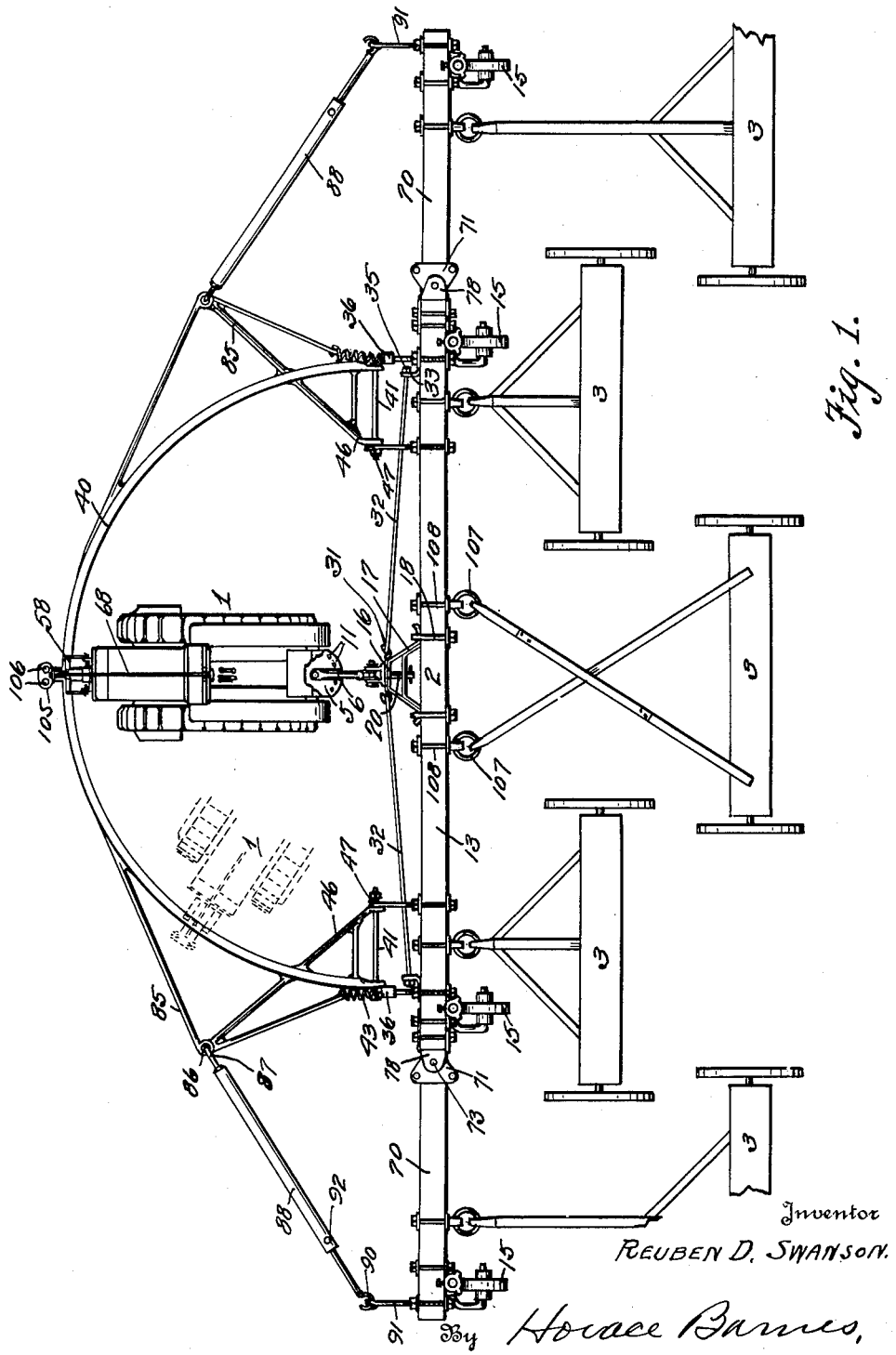
Figure 1 is a plan view of a trailer-cart of my invention shown connected in operative condition with the tractor and with the tillage tools connected thereto.
Figure 17:
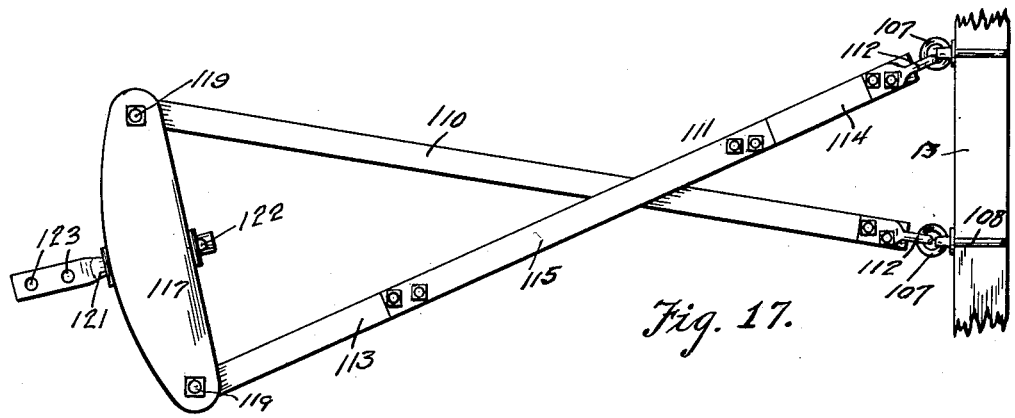
Fig. 17 is a plan view of the scissors-hitch element of the invention shown attached to the trailer-cart.
Figure 18:
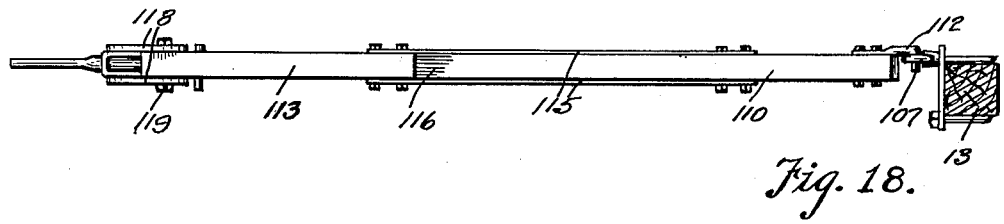
Fig. 18 is a view in side elevation of the same.
Figure 19:
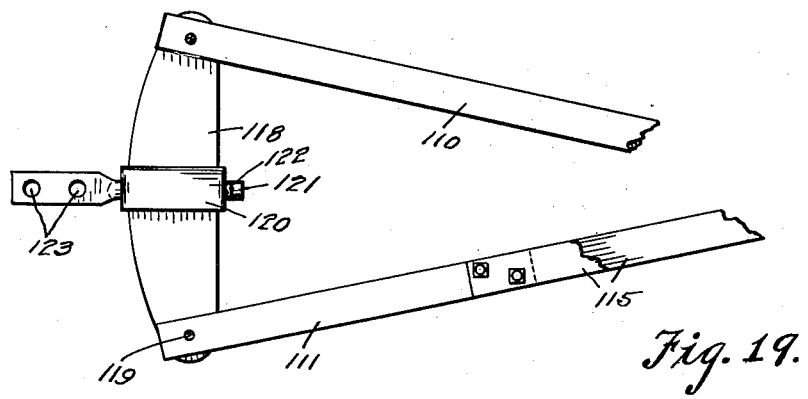
Fig. 19 is a fragmentary view in plan of the rear end of the scissors-hitch device with the top-plate of the end-bar thereof removed.
Figure 20:
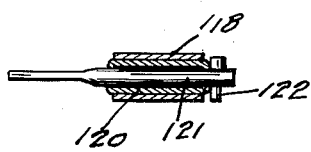
Fig. 20 is a view in cross-section on line 20—20 of Fig. 19.

Referring to said views, wherein similar parts are indicated by the same reference characters throughout the several views, the reference numeral 1 designates generally a tractor of any suitable type employed for power-draft purposes in the tillage of farm land. 2 indicates generally a trailer-cart adapted to be drawn by said tractor and to which the various tillage tools, such as plows, seed-drills, harrows and cultivators, severally indicated by the numeral 3, are connected in various ways to track behind the cart.

The tractor is equipped with a draft-plate 5 medially connected in rigid condition to the rear of the tractor and extending in horizontal relation therewith. A vertically directed triangular yoke 6 is pivoted at 7 to the forward end of said plate in the longitudinal axis of the tractor to swing in horizontal directions and extends to the rear of the plate terminating in a vertically disposed cylindrical bar-portion 8. Said yoke is provided with integral bars 10 in line with the yoke and disposed upon opposite sides of the plate 5, each of which is formed with a hole registering with any of a plurality of holes 11 formed in the plate 5 and arranged in arcuate relation about the pivot 7 as a center and in symmetrical arrangement with respect to the longitudinal axial line of the tractor. A pintle-pin 12 is utilized to extend through the bar-holes and a selected plate-hole 11 to retain the yoke in desired rigid position with respect to the said axis of the tractor to maintain the draft-pull either in line therewith as would obtain with the yoke secured in the middle one of the holes 11 or to secure a side-draft at the desired angle to either side by securing the bars 10 in either of the holes 11 offset from said middle hole.

The trailer-cart 2 comprises a beam 13 of stout timber mounted upon wheels 15 which will be more particularly described hereinafter. Medially of said beam draw-bar apparatus is provided consisting in an A-frame 16 whose legs 17 are rigidly secured to the beam by U-bolts 18. A draw-pin 20 is pivotally mounted in transverse members 21 and 22 of the A-frame in the transverse axis of the cart and is provided with a head 23 at its forward end including a pair of spaced apertured ears 25 between which the apertured ends of a strap 26 are received. A pintle-pin 27 extends through the apertures in said ears and strap to connect them together in a knuckle-joint adjustable in vertical directions while the draw-pin admits of rotary adjustments, thus affording a universal movement in the draw-bar apparatus to admit of the free play of the cart with relation to the ground surface while being drawn by the tractor.

The strap 26 is engaged at its middle looped portion about the vertical rear part 8 of the triangular yoke 6 when the cart is connected to the tractor and is pivotally retained at adjusted heights between set-collars 28 and 29 to provide draft in straight lines or at a desired vertical angle between the tractor and cart. A plate 30 is interposed between the outer transverse member 21 of the A-frame and the head 23 having a hook 31 upon each side to which tension-rods 32 are connected extending in angular relation towards the respective ends of the beam 13 where they are received in apertured brackets 33 and where desired tension may be applied to the rods through nuts 35 threaded upon the ends of the rods and bearing upon the brackets, thus stiffening and strengthening the beam.

It will be noted that the draft apparatus just described provides an extremely close draw-bar connection between the tractor and the trailer-cart whereby the cart may be more fully controlled in its movements and caused to follow closely the movements of the tractor, which result is promoted by the universal movements embodied in the draw-bar elements so that inequalities and slope of ground being cultivated may be followed by the cart in spite of such close-coupled condition while the tractor is in complete mastery of the directional movements of the cart when taken with the apparatus to be now described.

A control-frame is provided connecting the outer ends of the trailer-cart with the forward end of the tractor to more fully yield control of the cart to the tractor operator. A supporting-head 36 is provided at each end of the beam 13 rigidly mounted forwardly of the beam upon bolts 37 clamped to the beam by nuts 38 bearing upon plates 39, as seen in Fig. 5. Said head is in advance of the beam and extends in vertical relation in rigid condition upon the bolts 37. Medially of the heads 36 at each end of the beam a control-frame 40 is pivoted at its respective ends, as at 41, to swing in vertical directions in the axial line of the knuckle-joint formed at the pintle-pin 27. Extensions 42 are formed at top and bottom of each of the supporting-heads to which coil-springs 43 and 44 are respectively connected and extend in converging and counteracting relation to connection with the frame 40 forwardly of the head. Said springs may be made adjustable in tension through screw-and-nut connection with the extensions 41, as indicated at 45. In addition to the pivotal connection of the control-frame with the supporting-head as described I provide an offset pivotal support therefor at each side by means of an integral extension 46 of the control-frame directed inwardly and co-acting with a U-bolt structure, see Fig. 15, having an eye 47 at its outer end and through which the pivotal pin 41 extends.

The control-frame 40 may consist in a metal bar extending in generally arcuate form from each end of the trailer-cart as described to and about the forward end of the tractor where it is supported and detachably connected. A heavy metal strap 50 is rigidly connected to the forward end of the tractor from which extends forwardly in rigid condition in the longitudinal axis of the tractor a supporting-bar 51 upon which the mid-length portion of the control-frame 40 is rested under usual conditions of work and upon which it may rest in all of the relative positions assumed by the tractor and frame. A guard 52 is rotatably mounted upon the bar 51 adjacent its connection with the strap 50, as at 53, and overhangs the bar in parallel spaced relation. The guard 52 overlies the control-frame to prevent it from displacement under normal service conditions. The space between the bar 51 and the guard is of sufficient depth to admit the frame moving freely along the bar and is of sufficient length to admit of the frame being of considerable variation or distortion from a true circular arc without losing the support of the bar and guard.

The guard 52 is bifurcated longitudinally to accommodate between its divided portions a blade 55 pivoted at 56 in the rear end of the guard and arranged to engage within a notch 57 formed upon the upper face of the frame 40 medially of its ends at which position the trailer-cart will be disposed at right angles to the longitudinal axis of the tractor. The blade 55 thus forms a latch to maintain the frame and tractor in symmetrical relation and in operation to fully control the directional movements of the cart from the tractor.

A bifurcated lever 58 is pivoted at its two lower ends on bolts 60 supported in lugs 61 extending from the strap 50. Across said bifurcated end of the lever a slotted bar 62 is rigidly positioned in which slot an arm 63 of the blade 55 is received. A spring 65 is secured by coiling about the bolts 60 and its medial portion 66 is pressed against the forward end of the tractor while its opposite ends 67 are engaged to the rear of the lower ends of the lever 58 tending to urge the lever forwardly and thereby carry the blade 55 downwardly with yielding pressure into engagement with the notch 57 due to the engagement of the blade-arm 63 in the slotted-bar 62.

A pull-rod 68 is attached to the upper end of the lever 58 and extends to within easy reach of the tractor-operator whereby he may pull back the lever in opposition the spring 65 and thereby release the blade from its engagement with the control-frame and thereby permit to some extent independent movement of the tractor with relation to the frame and cart, as will be presently explained. Upon the release of the pull-rod the spring 65 will again assert itself to carry the blade downwardly into engagement with the frame and juxtaposed with the notch 57 will drop therein to again secure the frame in latched condition.

The provision of the slotted bar 62 with which the blade-arm 63 is engaged allows the blade and guard to swing freely within the limits of the slot to accommodate them to any practicable inclination from the horizontal that the control-frame may assume, as the frame will follow the lateral angles taken by the cart, which when plowing or tilling sloping ground may vary in inclination from that of the tractor.

For cultivating relatively wide areas extension-beams 70 are provided at each end of the beam 13 formed of timber of the same cross-sectional dimensions as the main beam. Hinge-connections are provided between the beam 13 and the extensions, see Figs. 12, 13 and 14, consisting in triangular plates 71 clamped to the top and bottom of each of the extension-beams by bolts 72 and extending through overhanging portions of said plates so that the bolts may not pass through the timber to weaken its integrity. A stud-pin 73 extends outwardly from each said plate at top and bottom, respectively. Similar plates 75 are secured in like manner by bolts 76 to the lateral sides of the main beam 13 provided with similar stud-pins 77. A universal link connection 78, see Fig. 13, is provided between said beams including a pair of parallel flanges 80 spaced apart to receive the end of the extension-beam therebetween, each said flange having an aperture 81 adjacent its outer end through which the respective stud-pin 73 protrudes to make a hinge-joint in lateral directions.

Complementary flanges 82 are formed in each said link extending in opposite directions and in planes rectangular to the flanges 80 whereby they may extend over the lateral sides of the ends of beams 13. The flanges 82 are similarly formed with apertures 83 to receive the respective stud-pins 77 and thus form a hinge-joint operable in vertical directions. Taken together it will be observed that the joint construction just described between the extensions and the main beam provides full play in the extensions to follow the unevennesses of the ground when being employed in extending the lateral reach of the trailer-cart. While I have shown the link 78 as formed of two interfitting pieces of metal it may be formed of a single integral piece of metal having the respective flanges struck out in the shape and manner shown, or it may be made as illustrated with the pieces welded or otherwise suitably connected in a single piece.

For supporting the outer ends of the extensions in longitudinal alignment with the main beam or at such relatively angular disposition as may be required I provide outriggers 85 integrally formed at each side of the control-frame having an eye 86 engageable by hooks 87 of telescopic rod-members 88 at whose other ends hooks 90 engage in an eye of U-bolts 91 similar to that shown in Fig. 15, secured at the outer end of each extension-beam. A set-screw 92 secures the component elements of the rod 88 to obtain the effective length thereof desired to maintain the extension-beam in suitable relation to the main-beam.

The outer ends of the extension-beams are provided with wheel-elements 15 similar to those upon which the main-beam is mounted. The manner of mounting said wheels is as follows: A plate 93 is positioned upon the rear face of the respective beam having apertured ears 95 extending above and below the beam through which ears bolts 96 extend whose opposite ends extend through apertured plates 97 upon the opposite side of the respective beam thus firmly clamping the plate 93 to the beam without piercing the beam or otherwise affecting the strength or integrity of the beam. Lugs 98 are struck out horizontally medially of each of the plates 93 at top and bottom thereof having vertically aligned apertures through which the spindle 99 of each wheel is extended. Set-collars 100 and 101 are secured by set-screws 102 above and below the respective lugs to secure the spindle and wheel in rotative condition whereupon the wheels are free to swing about the axis of the spindles. It may be desired to retain the wheels against such swinging action and and to cause them to remain in straight tracking relation with the cart. For this purpose protruding lugs 103 are formed upon the upper set-collars 100 which when the collar is inverted, as seen in Fig. 9, will depend upon opposite sides of the upper lug 98 and by being obstructed in movement thereby will prevent the spindle from turning. Where the spindle is to be allowed to swing freely on its axis the collar 100 is positioned so that the lugs 103 will be directed upwardly and will not then interfere with the free movement of the spindles.

In Fig. 16 I have illustrated a modified form of the control-frame wherein the lateral ends of the trailer-cart are rigidly connected with the nose of the tractor and no provision is made for release by the operator under working conditions. For this purpose I secure to the front end of the supporting-bar 51 a bracket 105 which is formed with a pair of apertures 106 in which are respectively secured the hooked ends 87 of the telescopic rod-members 88, heretofore described, whose other opposite hooked ends 90 are engaged with the eyes 41 of the respective heads 36 of the trailer-cart. With the rods 88 secured in rigid condition by the set-screws 92 the trailer-cart is secured to the tractor under complete control in all of its operative movements.

Tillage tools of all suitable varieties may be hitched to the cart and its extensions in a wide range of variations and expedients. As indicated at 3 in Fig. 1 I have shown a conventional form of seed-drill apparatus to indicate some of the methods of hitching such devices to the cart. Ring-bolt clamps 107 are secured to the beams at any points desired as will be clearly understood, the bolts 108 thereof extending upon the outer sides of the beams so that the integrity of the timber will not be impaired by the formation of holes therethrough. It will be noted that at no point are the beams penetrated or apertured or in any manner weakened, but upon the contrary the timber of which the beams are made is strengthened and bolstered by the many clamped plates secured thereon and by the distribution of the strains thereon afforded by the tension-rods 32 and the control-frame 40 or rods 88.

A particularly advantageous form of scissors-hitch peculiarly adapted for controlling the movements of the tools extending well to the rearward of the trailer-cart is shown in Figs. 17 to 20, inclusive, consisting in a pair of flat bars 110 and 111 of equal lengths, each being provided with hooks 112 at their forward ends engageable in ring-bolts 107 attached in spaced relation on the beam 13 or extensions thereof. The bar 110 is formed integrally of timber or metal while the bar 111 is formed compositely of end pieces 113 and 114 spaced apart and connected together by strips 115 overlapping and bolted to the top and bottom surfaces of said pieces, respectively, to provide a slot 116 in the middle portion of the bar wherethrough the bar 110 extends in crossed or so-called scissors relation.

An end bar 117 to which the rear ends of the bars 110 and 111 are pivotally connected comprises top and bottom plates 118 secured together by the pivot-bolts 119 to which the crossed bars are connected at the respective ends of the end-bar. A rectangular spacer-block 120 is rigidly secured medially between the plates 118 through which extends a draw-bar 121 extending transversely to the end-bar and normally in parallel with the line of motion of the apparatus. Said draw-bar is rotatively mounted in said block and is secured therein by a cotter-pin 122 forwardly of the block and at its rear end is flattened and provided with apertures 123 to which the tillage tool may be connected.

It will be observed that the construction of such scissors-hitch is extremely simple and assures that the tool drawn thereby will follow more surely the path of the trailer-cart than has been usual hitherto by analogous means as the cart when turning will pull forwardly the end of the end-bar furthest away from the end of the cart that is wheeling about and thus cause the tool connected to the hitch to track in its proper and established relation with the cart. Also the rotary movement allowed the draw-bar of the apparatus admits of the tillage tool following more closely the contours of rough ground and makes for more efficiency in operation and better work accomplished.

It will be seen that provision has been made in my invention for an extremely close draw-bar connection between the tractor and trailer-cart whereby the cart is reliably held in advantageous operative relation behind the tractor to be drawn wherever the tractor pulls it and with little opportunity for sidewise movements when plowing or cultivating on sloping or uneven ground. Such connections admit of all necessary movements through the draft connections allowing for universal movement in a simple and practicable manner so that although close-hauled behind the tractor the cart can accommodate itself to all conditions of broken or hilly land.

The control exercised by the tractor over the cart is further increased by the provision of the control-frame 40 securely holding the ends of the cart against undue sideweaving or slip and reliably maintaining the beam 13 in rectangular relation with the longitudinal axis of the tractor at all times except when released for turning movements. Considerable difficulty has been hitherto experienced in making turns of wide-extending trailer-carts, particularly so that they have a strong tendency to back upon the end towards which the turn is made. With the present apparatus the blade 55 is released from the notch 57 when a turn is to be made and the tractor is steered in the proper turning direction whereupon the tractor will veer within the frame as shown in broken lines in Fig. 1, while making the turn and will carry both ends of the cart forwardly if desired or pivot the cart about one end in wheeling fashion whereby the rows or furrows of the field may be exactly matched and making a full half-turn in smaller space and with greater exactitude than has hitherto been accomplished with long trailer-carts to my knowledge.

Having described my invention, what I claim, is:—

1. Trailer-cart apparatus for tractors, consisting in combination with a tractor, of a beam arranged to extend at right angles to the longitudinal axis of the tractor, draw-bar connections between the tractor and said beam, and connections between the opposite ends of the beam and the tractor forwardly of said draw-bar connections to maintain said beam in operative right-angled relation with the tractor.

2. Trailer-cart apparatus for tractors, consisting in combination with a tractor, of a beam arranged to extend at right angles to the longitudinal axis of the tractor, draw-bar connections between the tractor and said beam, connections between the opposite ends of the beam and the tractor forwardly of said draw-bar connections to maintain said beam in operative right-angled relation with the tractor and means operable from the driving-seat of the tractor to release said last named connections whereby said tractor may be turned relatively to the beam.

3. Trailer-cart apparatus for tractors, consisting in combination with a tractor, of a beam operatively connected at its midlength to the rear of said tractor, and a rigid control-frame connected at its ends to the opposite ends of the beam and connected between its ends to the fore part of the tractor.

4. Trailer-cart apparatus for tractors, consisting in combination with a tractor, of a beam operatively connected at its midlength to the rear of said tractor, and a rigid control-frame connected at its ends to the opposite ends of the beam and releasably connected between its ends the fore part of the tractor.

5. Trailer-cart apparatus for tractors, consisting in combination with a tractor, of a beam operatively connected at its midlength to said tractor, a control-frame connected at its opposite ends to the beam and connected intermediate its ends to the tractor, and means operable by the tractor-driver to release the said connection between the frame and the tractor.

6. Trailer-cart apparatus for tractors, consisting in combination with a tractor, of a beam operatively connected at its midlength to said tractor, a control-frame connected at its respective ends to adjacent the ends of the beam and extending about the forward end of the tractor, means to support said frame on the tractor, and means to detachably secure the frame at its midlength to the tractor.

7. Trailer-cart apparatus for tractors, consisting in a tractor, a beam provided at its midlength with draft connections with said tractor, and a control-frame of substantially arcuate form connected at its ends to the opposite ends of the beam and supported at its midlength upon the forward part of said tractor whereby the tractor may veer in its course within said control-frame.

8. Trailer-cart apparatus for tractors, consisting in a tractor, a beam provided at its midlength with draft connections with said tractor, a control-frame connected at its ends to the opposite ends of the beam and extending about the fore part of the tractor, said frame having a notch formed intermediate its ends, a support for said frame upon the forward end of the tractor, and a pivotally mounted, spring-pressed blade engageable in said notch to releasably secure said frame and tractor in latched condition.

9. A structure as specified in claim 8 in combination with means operable by the tractor-driver to release the spring-pressed blade from the notch of the control-frame.

10. Trailer-cart apparatus for tractors, consisting in combination with a tractor, a wheel-supported main beam provided at its midlength with draft connections with the tractor, and a rigid control-frame connected at its ends to the opposite ends of the main beam and supported at its midlength upon the forward part of the tractor, of wheel-supported extension-beams pivotally connected to the ends, respectively, of said main-beam to extend in substantial alignment therewith, and means to secure the outer ends of said extension-beams to the control-frame.

11. Trailer-cart apparatus for tractors, consisting in combination with a tractor, a wheel-supported main-beam provided at its midlength with draft connections with the tractor, and a control-frame connected at its ends to the opposite ends of the main beam and supported at its midlength upon the forward part of the tractor, of wheel-supported extension-beams pivotally connected to the ends, respectively, of said main beam, and means adjustable in lengths to connect the outer ends of the extension-beams to said control-frame.

12. Trailer-cart apparatus for tractors, consisting in combination with a tractor, of a beam operatively connected at its midlength to said tractor said connections including a knuckle-joint, a rigid control-frame pivotally connected to said beam, said pivotal connections being in alignment with said knuckle-joint, the front end of the frame being connected to the front end of the tractor.

REUBEN D. SWANSON.